United States Patent
Ranganathan et al.

(10) Patent No.: US 11,973,231 B2
(45) Date of Patent: Apr. 30, 2024

(54) MEMBRANE ELECTRODE ASSEMBLY (MEA) FOR PROTON EXCHANGE MEMBRANE ELECTROCHEMICAL CELL

(71) Applicant: BLOOM ENERGY CORPORATION, San Jose, CA (US)

(72) Inventors: Srikanth Ranganathan, San Jose, CA (US); Vijay Radhakrishnan, San Jose, CA (US); Vaibhav Nirgude, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/347,953

(22) Filed: Jul. 6, 2023

(65) Prior Publication Data

US 2023/0361316 A1    Nov. 9, 2023

Related U.S. Application Data

(62) Division of application No. 17/744,710, filed on May 15, 2022.

(51) Int. Cl.
*H01M 4/88* (2006.01)
*H01M 4/86* (2006.01)
(Continued)

(52) U.S. Cl.
CPC ....... *H01M 4/8803* (2013.01); *H01M 4/8657* (2013.01); *H01M 4/8835* (2013.01);
(Continued)

(58) Field of Classification Search
CPC ............. H01M 4/8803; H01M 4/8657; H01M 4/8835; H01M 4/8875; H01M 4/8882;
(Continued)

(56) References Cited

FOREIGN PATENT DOCUMENTS

| EP | 3167502 | * 11/2016 | ............ H01M 4/88 |
| JP | 2009230892 | * 10/2009 | ............ H01M 4/86 |
| WO | WO 0235624 | * 5/2002 | ............ H01M 8/00 |

OTHER PUBLICATIONS

Computer-generated translation of) WO 0235624, Biegert et al., "Membrane Electrode Arrangement With an Optimised Electrode Structure", May 2, 2002.*

(Continued)

*Primary Examiner* — Raymond Alejandro
(74) *Attorney, Agent, or Firm* — Evergreen Valley Law Group; Kanika Radhakrishnan (57) ABSTRACT

A membrane electrode assembly (MEA) includes an ionically-conductive proton exchange membrane. Further, the MEA includes an anode contacting a first side of the membrane. The anode includes an anode gas diffusion layer (GDL). Further, the anode includes a first anode catalyst layer containing first catalyst particles, a hydrophobic polymer bonding agent, and a first ionomer bonding agent that lacks functional chains on a molecular backbone. The anode also includes a second anode catalyst layer containing second catalyst particles and a second ionomer bonding agent that includes functional chains on a molecular backbone. The MEA also includes a cathode contacting a second side of the membrane and comprising third catalyst particles and a cathode GDL.

3 Claims, 6 Drawing Sheets

(51) Int. Cl.
  *H01M 4/90* (2006.01)
  *H01M 8/1004* (2016.01)
  *H01M 8/241* (2016.01)
(52) U.S. Cl.
  CPC ....... *H01M 4/8875* (2013.01); *H01M 4/8882* (2013.01); *H01M 4/9058* (2013.01); *H01M 8/1004* (2013.01); *H01M 8/241* (2013.01); H01M 2004/8684 (2013.01); H01M 2004/8689 (2013.01); H01M 2300/0068 (2013.01)
(58) Field of Classification Search
  CPC .. H01M 4/9058; H01M 8/1004; H01M 8/241; H01M 2004/8684; H01M 2004/8689; H01M 2300/0068
  See application file for complete search history.

(56) References Cited

OTHER PUBLICATIONS

Computer-generated translation of ) JP 2009230892, Yamada et al., "Catalyst Layer, Membrane Electrode Assembly, Fuel Cell, and Method of Manufacturing Catalyst Layer", Oct. 8, 2009.*

* cited by examiner

MEMBRANE ELECTRODE ASSEMBLY (MEA) FOR PROTON EXCHANGE MEMBRANE ELECTROCHEMICAL CELL

FIELD

The present disclosure relates generally to catalyst ink compositions and methods of depositing the ink compositions to form electrochemical cells used for hydrogen recovery in a fuel cell system.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments of the present disclosure, a method of forming membrane electrode assembly (MEA) comprises dispensing a first anode ink comprising first catalyst particles, a hydrophobic polymer bonding agent and an ionomer bonding agent, dispersed in a first carrier; heat-treating the first anode ink to form a first anode catalyst layer of an anode; dispensing a second anode ink on the first anode catalyst layer, the second anode ink comprising second catalyst particles and an ionomer bonding agent, dispersed in a second carrier; heat-treating the second anode ink to form a second anode catalyst layer of the anode; dispensing a cathode ink; and heat-treating the cathode ink to form a cathode layer.

According to various embodiments of the present disclosure, an anode ink for forming an anode layer of a carbon monoxide (CO) tolerant membrane electrode assembly (MEA) comprises: catalyst particles comprising platinum or a platinum alloy; an ionomer binding agent; a hydrophobic binding agent; at least two solvents selected from glycerol, ethylene glycol, propylene glycol, N-methyl-2-pyrrolidone (NMP), isopropyl alcohol (IPA), methyl ethyl ketone (MEK), methyl isobutyl ketone (MIBK), acetone, ethyl lactate, diglyme, propylene glycol monomethyl ether acetate (PGMEA), butyl acetate, or heptanol; and water.

According to various embodiments of the present disclosure a membrane electrode assembly (MEA) includes an ionically-conductive proton exchange membrane, an anode contacting a first side of the membrane and a cathode contacting a second side of the membrane and including third catalyst particles and a cathode GDL. The anode includes an anode gas diffusion layer (GDL), a first anode catalyst layer containing first catalyst particles, a hydrophobic polymer bonding agent, and a first ionomer bonding agent that lacks functional chains on a molecular backbone, and a second anode catalyst layer containing second catalyst particles and a second ionomer bonding agent that includes functional chains on a molecular backbone.

DETAILED DESCRIPTION OF THE PREFERRED EMBODIMENTS

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%. In addition, weight percentages (wt %) and atomic percentages (at %) as used herein respectively refer to a percent of total weight or a percent of a total number of atoms of a corresponding composition.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The first and second embodiments of the invention illustrate how the electrochemical pump separator is used together with a fuel cell system, such as a solid oxide fuel cell system. It should be noted that other fuel cell systems may also be used.

In the system of the first embodiment, a fuel humidifier is used to humidify the fuel inlet stream provided to the fuel cell stack. In the system of the second embodiment, the fuel humidifier may be omitted. A portion of the fuel cell stack fuel exhaust stream is directly recycled into the fuel inlet stream to humidify the fuel inlet steam. Another portion of the fuel cell stack fuel exhaust stream is provided to the separator, and the separated hydrogen is then provided to the fuel inlet stream.

Figure 1:
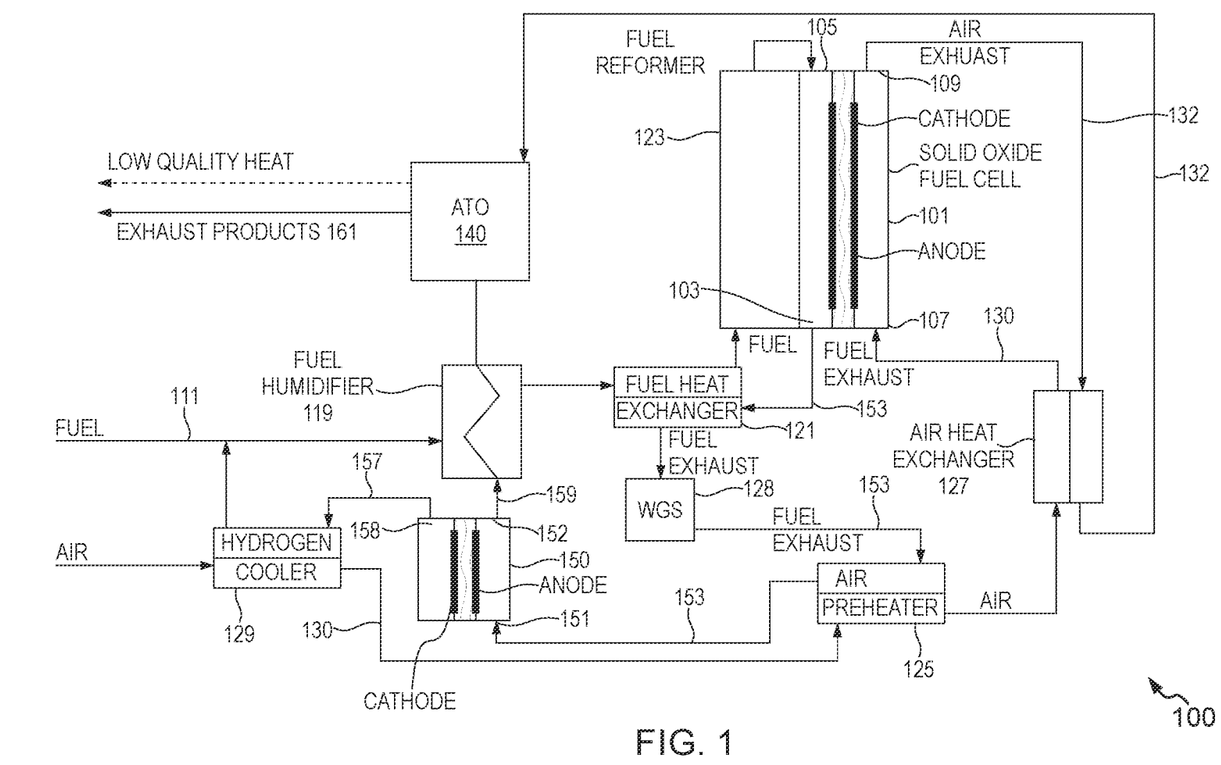
FIGS. 1, 2, and 3A are schematic diagrams of fuel cell systems according to various embodiments of the present disclosure.

FIG. 1 is a schematic showing a fuel cell system 100 according to the first embodiment of the present disclosure. The system 100 contains a fuel cell stack 101, such as a solid oxide fuel cell stack (illustrated schematically to show one solid oxide fuel cell of the stack containing a ceramic electrolyte, such as yttria stabilized zirconia (YSZ), an anode electrode, such as a nickel-YSZ cermet, and a cathode electrode, such as lanthanum strontium manganite).

The system 100 also contains an electrochemical pump separator 150 that electrochemically separates hydrogen from the fuel exhaust stream. The pump separator 150 may comprise any suitable proton exchange membrane device comprising a polymer electrolyte. Preferably, the pump separator 150 comprises a stack of carbon monoxide tolerant electrochemical cells, such as a stack of high-temperature, low-hydration ion exchange membrane cells. These cells generally operate in a temperature range of above 100° C. to about 200° C. Thus, the heat exchangers in the system 100 preferably keep the fuel exhaust stream at a temperature of about 120° C. to about 200° C., such as about 160° C. to about 190° C.

The system 100 also contains a fuel exhaust conduit 153 that operatively (i.e., fluidly) connects a fuel exhaust outlet 103 of the fuel cell stack 101 to an anode inlet 151 of the pump separator 150. The system 100 also contains a product conduit 157 that operatively (i.e., fluidly) connects a cathode outlet 158 of the pump separator 150 to a fuel inlet conduit 111 that operatively (i.e., fluidly) connects a fuel inlet 105 of the stack 101 to an external fuel source. The system 100 also contains a separator exhaust conduit 159 that operatively (i.e., fluidly) connects an anode outlet 152 of the pump separator 150 to an anode tail gas oxidizer (ATO) 140 or to an atmospheric vent.

The system 100 further includes a fuel humidifier 119 operatively connected to the fuel inlet conduit 111 and the separator exhaust conduit 159. In operation, the fuel humidifier 119 humidifies fuel in fuel conduit 111, which includes recycled hydrogen, using water vapor contained the separator exhaust output to the separator exhaust conduit 159. The fuel humidifier 119 may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, both incorporated herein by reference in their entirety. For example, one suitable type of humidifier comprises a water vapor and enthalpy transfer Nafion® based, water permeable membrane available from Perma Pure LLC. The fuel humidifier 119 passively transfers water vapor and enthalpy from the fuel exhaust stream into the fuel inlet stream to provide a 2 to 2.5 steam to carbon ratio in the fuel inlet stream. The temperature of the fuel in the fuel inlet conduit 111 may be raised to about 80 to about 90 degrees Celsius, by the fuel humidifier 119.

The system 100 also contains a recuperative heat exchanger 121 (e.g., anode recuperator) operatively connected to the fuel inlet conduit 111 and the fuel exhaust conduit 153. The heat exchanger 121 heats the fuel in the fuel inlet conduit 111 using heat extracted from the fuel exhaust in the fuel exhaust conduit 103. The heat exchanger 121 helps to raise the temperature of the incoming fuel and reduces the temperature of the fuel exhaust, so that it may be further cooled in the condenser and such that it does not damage the fuel humidifier 119.

If the fuel cells are external fuel reformation type cells, then the system 100 contains a fuel reformer 123. The reformer 123 reforms a hydrocarbon fuel inlet stream into hydrogen and carbon monoxide containing fuel stream which is then provided into the stack 101. The reformer 123 may be heated radiatively, convectively, and/or conductively by the heat generated in the fuel cell stack 101 and/or by the heat generated in an optional ATO 140, as described in U.S. Pat. No. 7,422,810, filed Dec. 2, 2004, incorporated herein by reference in its entirety. Alternatively, the external reformer 123 may be omitted if the stack 101 contains cells of the internal reforming type, where reformation occurs primarily within the fuel cells of the stack.

The system 100 also includes an air inlet conduit 130 fluidly connected to an air inlet 107 of the stack 101. Optionally, the system 100 includes an air preheater heat exchanger 125 operatively connected to the air inlet conduit 130 and configured to preheat the air in the air inlet conduit 130 using heat extracted from the fuel exhaust in the fuel exhaust conduit 153. If desired, this heat exchanger 125 may be omitted.

The system 100 also includes an air exhaust conduit 132 fluidly connecting an air exhaust outlet 109 of the stack 101 to the ATO 140. The system 100 preferably contains an air heat exchanger 127 operatively connected to the air inlet conduit 130 and the air exhaust conduit 132. This heat exchanger 127 further heats the air in the air inlet conduit 130 using heat extracted from the fuel cell stack air exhaust (i.e., oxidizer or cathode exhaust) in the air exhaust conduit 132. If the preheater heat exchanger 125 is omitted, then the air is provided directly into the heat exchanger 127 by a blower or other air intake device.

The system 100 optionally includes an optional hydrogen cooler heat exchanger 129 operatively connected to the product conduit 157 and the air inlet conduit 130. The heat exchanger 129 extracts heat from the separated hydrogen output from the pump separator 150, using air flowing through the air inlet conduit 130.

The system 100 may also contain an optional water-gas shift (WGS) reactor 128 operatively connected to the fuel exhaust conduit 153. The WGS reactor 128 may be any suitable device that converts at least a portion of the water in the fuel exhaust into free hydrogen ($H_2$). For example, the WGS reactor 128 may comprise a tube or conduit containing a catalyst that converts some or all of the carbon monoxide and water vapor in the fuel exhaust stream into carbon dioxide and hydrogen. Thus, the WGS reactor 128 increases the amount of hydrogen in the fuel exhaust. The catalyst may be any suitable catalyst, such as an iron oxide or a chromium-promoted iron oxide catalyst. The WGS reactor 128 may be operatively connected to the fuel exhaust conduit 153, between the fuel heat exchanger 121 and the air preheater heat exchanger 125.

The system 100 may operate as follows. A fuel inlet stream (also referred to as "fuel" or "fuel stream") is provided to the fuel cell stack 101 through fuel inlet conduit 111. The fuel may comprise any suitable hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

As the fuel stream passes through the humidifier 119, the fuel stream is humidified. The humidified fuel then passes through the fuel heat exchanger 121 where the humidified fuel is heated by the fuel cell stack fuel exhaust. The heated and humidified fuel is then provided into the fuel reformer 123, which is preferably an external reformer. For example, the fuel reformer 123 may comprise a reformer described in U.S. Pat. No. 7,422,810, filed on Dec. 2, 2004, incorporated herein by reference in its entirety.

The fuel reformer 123 may be any suitable device that is capable of partially or wholly reforming a hydrocarbon fuel to form a carbon-containing and free-hydrogen-containing fuel. For example, the fuel reformer 123 may be any suitable device which can reform a hydrocarbon gas into a gas mixture of free hydrogen and a carbon containing gas. For example, the fuel reformer 123 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to a fuel flow direction in the fuel inlet conduit 111, the humidifier 119 is located upstream of the heat exchanger 121, which is located upstream of the reformer 123, which is located upstream of the stack 101.

The air or other oxygen containing gas (i.e., oxidizer) (also referred to as an "air inlet stream" or "air stream") that is provided to the stack 101 through the air inlet conduit 130 is heated by the air heat exchanger 127, using the cathode exhaust in the air exhaust conduit 132. If desired, the air in the air inlet conduit 130 may also pass through the hydrogen cooler heat exchanger 129 and/or through the air preheater heat exchanger 125, to further increase the temperature of the air stream, before providing the air into the stack 101.

During operation, the stack 101 generates electricity using the provided fuel and air, and generates the fuel exhaust and the air exhaust. The fuel exhaust may contain hydrogen, water vapor, carbon monoxide, carbon dioxide, some unreacted hydrocarbon fuel such as methane, and other reaction by-products and impurities. The fuel exhaust may include about 25% of the fuel provided to the stack 101.

The fuel exhaust is output from the fuel exhaust outlet 103 and provided to the pump separator 150 by the fuel exhaust conduit 153. The pump separator 150 electrochemically separates at least a portion of the hydrogen ($H_2$) contained in the fuel exhaust. The separated hydrogen is output from the cathode outlet 158 and provided to the fuel inlet conduit 111 by the product conduit 157 where the hydrogen and is mixed with incoming fresh fuel. Preferably, the hydrogen is provided to the fuel inlet conduit 111 upstream of the humidifier 119.

The fuel exhaust stream in the fuel exhaust conduit 153 is first provided into the heat exchanger 121, where its temperature is lowered, preferably to less than 200° C., while the temperature of the incoming fuel is raised. If the WGS reactor 128 and the air preheater heat exchanger 125 are present, then the fuel exhaust is provided through the WGS reactor 128 to convert at least a portion of the water vapor and a majority of the residual carbon monoxide into carbon dioxide and hydrogen. The temperature of the fuel exhaust is then further reduced while passing through the heat exchanger 125, by transferring heat to the air in the air inlet conduit 130. The temperature of the fuel exhaust may be reduced to from about 90 to 110° C., for example.

The fuel exhaust is then provided to the anode inlet 151 of the pump separator 150 via conduit 153. The pump separator 150 may be configured to separate a majority of the hydrogen from the fuel exhaust, such as about 85% of the hydrogen in the fuel exhaust stream. Water vapor, carbon dioxide, carbon monoxide and remaining hydrocarbon gas remaining in the fuel exhaust may be provided to the humidifier 119 by conduit 159.

In the fuel humidifier 119, a portion of the water vapor in the fuel exhaust is transferred to the fuel in the fuel inlet conduit 111 to humidify the fuel. The fuel may be humidified to 80° C. to 90° C. dew point. The remainder of the fuel exhaust stream is then provided into the ATO 140 along with the air (i.e., cathode) exhaust from the stack 101, where the gasses are oxidized to provide low quality heat. The exhaust from the ATO may be provided to an ATO exhaust conduit 161. Heat from the ATO 140 may be used to heat the reformer 123, it may be provided to other parts of the system 100, or may be provided to devices outside the system 100, such as a building heating system.

The hydrogen separated by the pump separator 150 is output from the outlet 158 and provided by the product conduit 157 to the fuel inlet conduit 111, where it is mixed with incoming fuel. If desired, prior to being provided to the fuel inlet conduit 111, the hydrogen may be cooled in heat exchanger 129, where the hydrogen stream exchanges heat with air in the air inlet conduit 130. The temperature of the hydrogen is lowered in the heat exchanger 129 before being provided into the fuel inlet conduit 111. Thus, the hydrocarbon fuel is mixed with a low dew point, near ambient temperature, recycled hydrogen recovered from the anode exhaust gas with the electrochemical hydrogen pump separator 150.

Thus, with respect to the flow direction of the fuel exhaust, the heat exchanger 121 is located upstream of the WGS reactor 128, which is located upstream of the heat exchanger 125, which is located upstream of the pump separator 150, which is located upstream of the humidifier 119 and the fuel inlet conduit 111.

Figure 2:
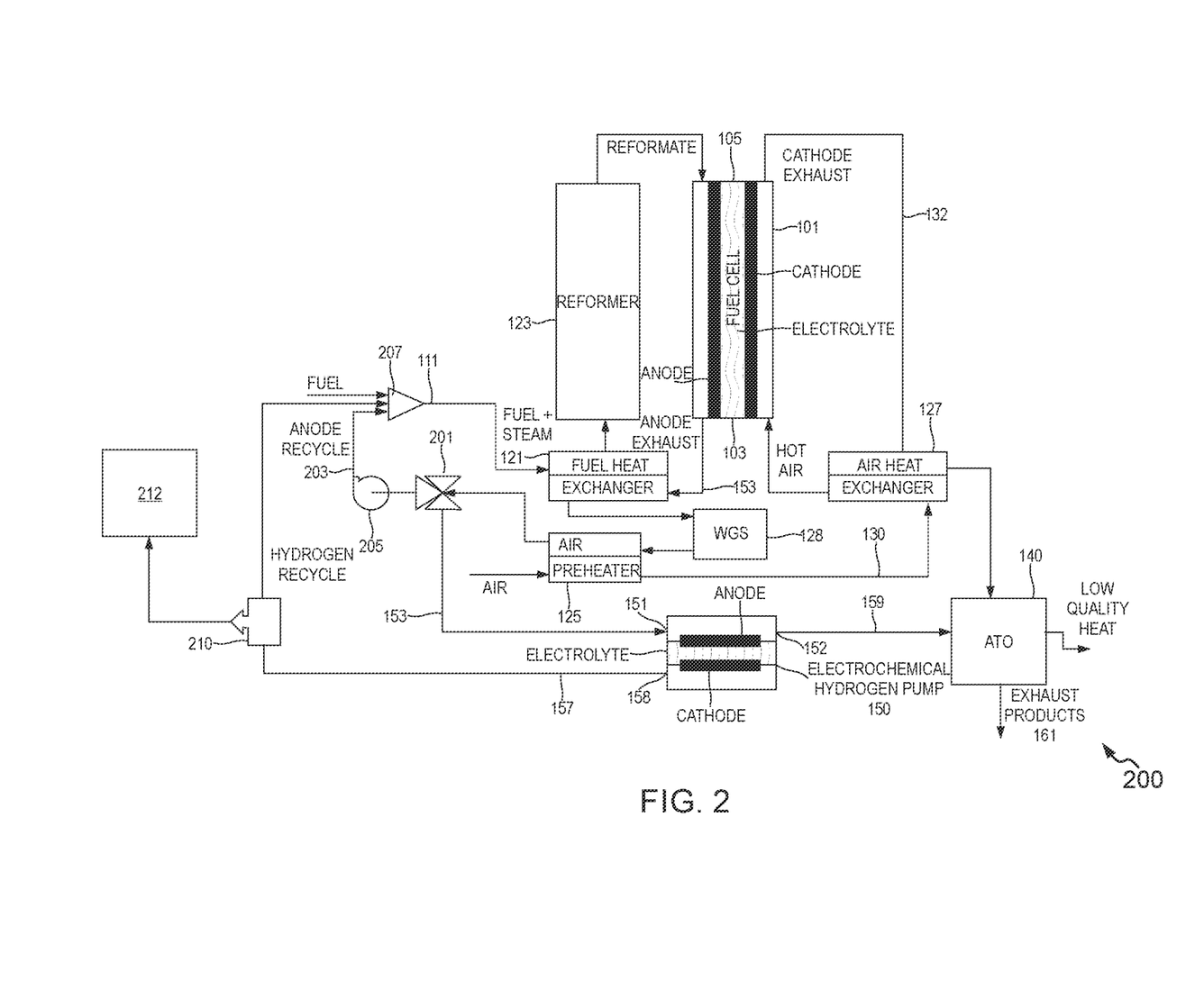

FIG. 2 is a schematic showing a fuel cell system 200 according to the second embodiment of the present disclosure. The system 200 is similar to system 100 and contains a number of components in common. Those components which are common to both systems 100 and 200 are numbered with the same numbers in FIGS. 1 and 2 and will not be described further.

One difference between systems 100 and 200 is that system 200 preferably, but not necessarily lacks, the humidifier 119. Instead, a portion of the water vapor containing stack fuel exhaust stream is directly recycled into the stack fuel inlet stream. The water vapor in the fuel exhaust stream is sufficient to humidify the fuel inlet stream.

The system 200 may contain a fuel exhaust splitter 201, a recycling conduit 203, a blower or compressor 205, and a mixer 207. The splitter 201 may be a computer or operator controlled multi-way valve, for example a three-way valve, or another fluid splitting device. The splitter 201 may be operatively connected to the fuel exhaust conduit 153 and the recycling conduit 203. In particular, the splitter 201 may be configured to selectively divert all or a portion of the fuel exhaust in the fuel exhaust conduit 153 to the recycling conduit 203.

The mixer 207 may be operatively connected to the fuel inlet conduit 111, the recycling conduit 203, and the product conduit 157. The recycling conduit 203 may fluidly connect the splitter 201 to the mixer 207. The mixer 207 may be configured to mix fresh fuel with fuel exhaust provided by the recycling conduit 203 and/or hydrogen provided by the product conduit 157.

The blower or compressor 205 may be operatively connected to the recycling conduit 203. The blower or compressor 205 may be configured to move the fuel exhaust through the recycling conduit 203 to the mixer 207. In operation, the blower or compressor 205 controllably provides a desired amount of the fuel exhaust to the fuel inlet conduit 111, via the mixer 207.

The method of operating the system 200 is similar to the method of operating the system 100. One difference is that the fuel exhaust is separated into at least two streams by the splitter 201. The first fuel exhaust stream is recycled to the fuel inlet stream, while the second stream is directed into the pump separator 150 where at least a portion of hydrogen contained in the second fuel exhaust stream is electrochemically separated from the second fuel exhaust stream. The hydrogen separated from the second fuel exhaust stream is then provided into the fuel inlet conduit 111 by the product conduit 157. For example, between 50% and 70%, such as about 60% of the fuel exhaust may be provided to the blower or compressor 205, while the remainder may be provided toward the pump separator 150.

Preferably, the fuel exhaust first flows through the heat exchangers 121 and 125, and the WGS reactor 128, before being provided into the splitter 201. The fuel exhaust may be cooled to about 200° C. or less, such as to about 120° C. to about 180° C., in the heat exchanger 125, and prior to being provided into the splitter 201 where it is divided into two streams. This allows the use of a low temperature blower 205 to controllably recycle a desired amount of the fuel exhaust stream into the fuel inlet conduit 111, since such a blower may be adapted to move a gas stream that has a temperature of about 200° C. or less.

The blower or compressor 205 may be computer or operator controlled and may vary the amount of the fuel exhaust stream being provided into the fuel inlet stream depending on the conditions described below. In some embodiments, the system 200 may optionally include a selector valve 210 operatively connected to the product conduit 157. The selector valve 210 may be fluidly connected to an auxiliary device 212, such as a hydrogen storage device a hydrogen using device, such as a PEM (i.e., proton exchange membrane, also known as polymer electrolyte membrane) fuel cell in a vehicle or another hydrogen using device or to a hydrogen storage vessel. The selector valve 210 may be configured to divert a selected amount of the hydrogen in the product conduit 157 to the auxiliary device 212. For example, all or a portion of the hydrogen may be provided to either the auxiliary device 212 or the mixer 207, or the hydrogen may be alternately provided to the mixer 207 and the auxiliary device 212.

The blower or compressor 205 and the optional selector valve 210 may be operated by a computer or an operator to controllably vary the gas flow based on one or more of the following conditions: i) detected or observed conditions of the system 100 (i.e., changes in the system operating conditions requiring a change in the amount of hydrogen in the fuel inlet stream); ii) previous calculations provided into the computer or conditions known to the operator which require a temporal adjustment of the hydrogen in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

It is believed that by recycling at least a portion of the hydrogen separated from the fuel exhaust (i.e., tail) gas into the fuel inlet conduit 111, a high efficiency operation of the fuel cell system is obtained. Furthermore, the overall fuel utilization is increased. The electrical efficiency (i.e., AC electrical efficiency) can range between about 50% and about 60%, such as between about 54% and about 60% for the methods of the first and second embodiments when the per pass fuel utilization rate is about 75% (i.e., about 75% of the fuel is utilized during each pass through the stack). An effective fuel utilization of about 94% to about 95% is obtained when the per pass utilization is about 75%, and about 85% of the fuel exhaust gas hydrogen is recycled back to the fuel cell stack by the pump separator 150. Even higher efficiency may be obtained by increasing the per pass fuel utilization rate above 75%, such as about 76-80%. At steady-state, the methods of the first and second embodiments eliminate the need for generating steam when steam methane reformation is used to create the feed gas to the fuel cell. The fuel exhaust stream contains enough water vapor to humidify the fuel inlet stream to the stack at steam to carbon ratios of 2 to 2.5. The increase in net fuel utilization and the removal of heat requirement to generate steam increases the overall electrical efficiency. In contrast, without recycling hydrogen, the AC electrical efficiency is about 45% for a fuel utilization rate within the stack of about 75% to 80%.

Figure 3A:
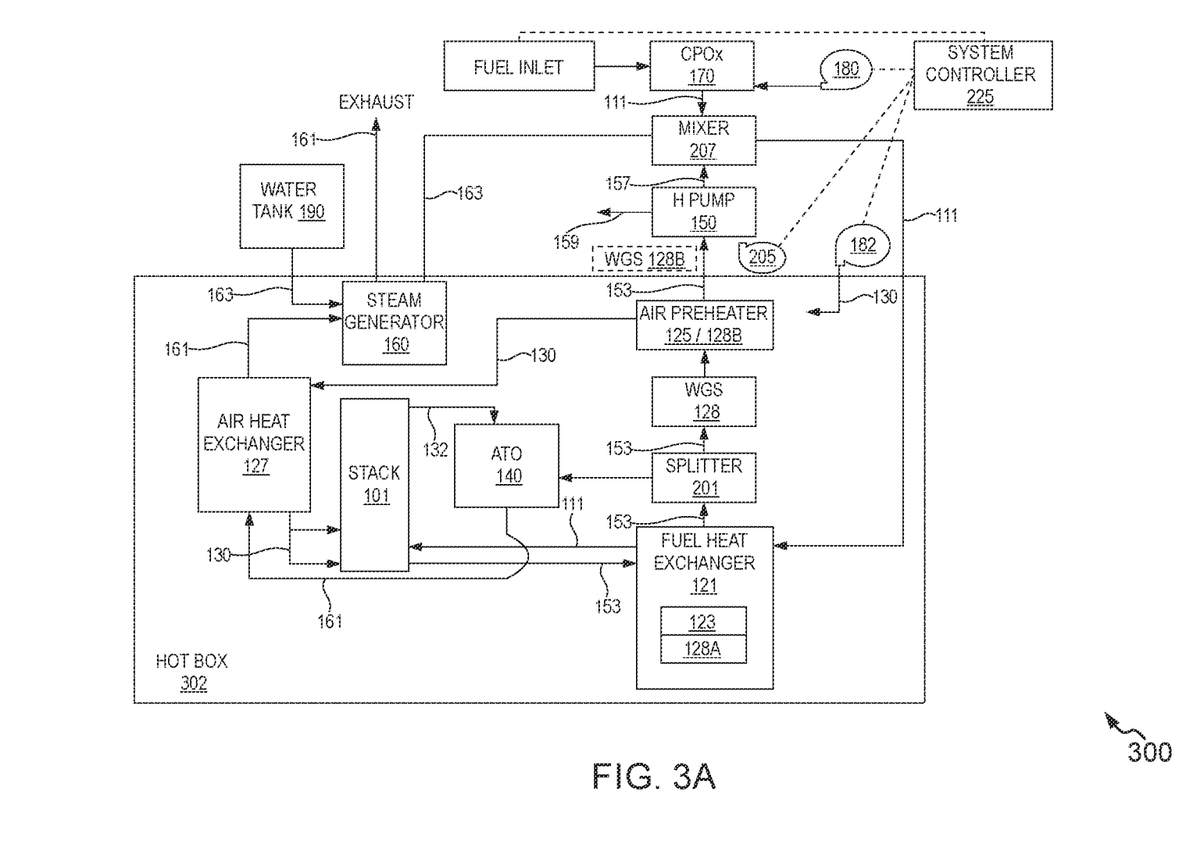

FIG. 3A is a schematic diagram of a fuel cell system 300 according to the third embodiment of the present disclosure. The system 300 may include a number of components similar to the components previously described with respect to the systems 100 and 200 of the first and second embodiments, which may be numbered with the same numbers as in FIGS. 1 and 2, and will not be described in detail.

Figure 3B:
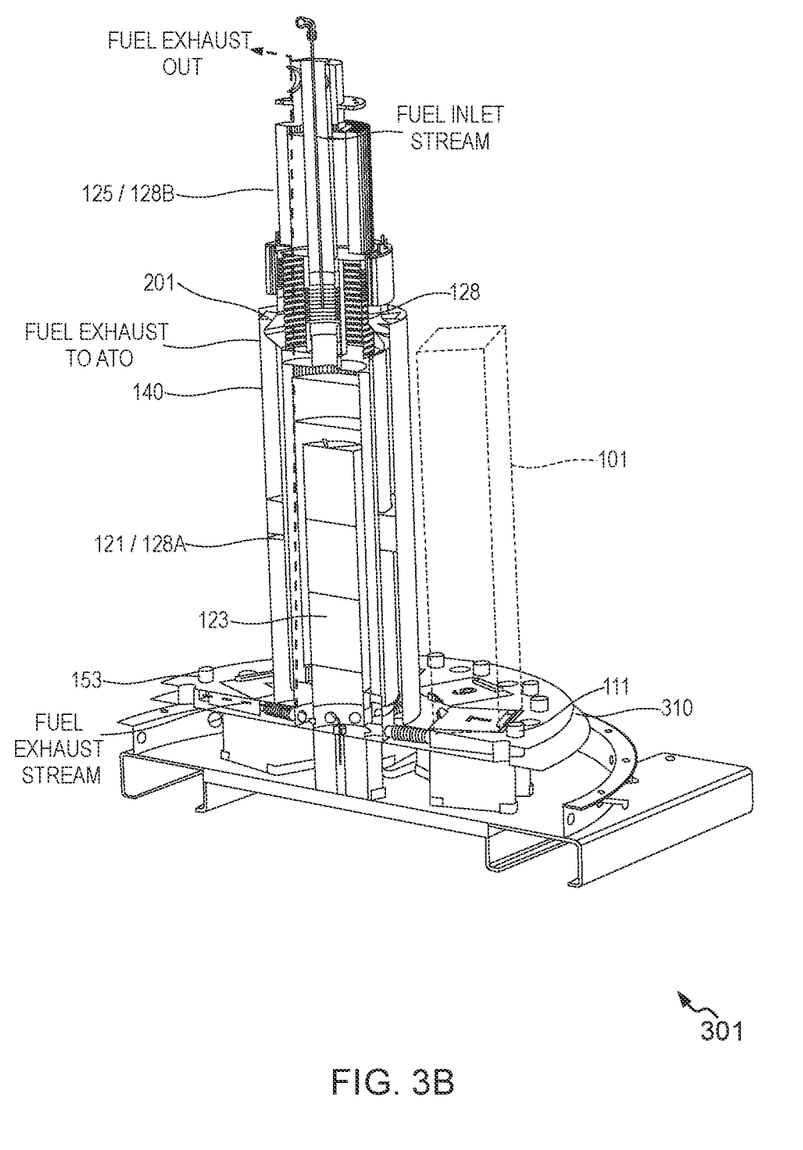
FIG. 3B is a sectional perspective view of a central column of the fuel cell system of FIG. 3A.

FIG. 3B is a sectional perspective view of a central column 301 of the fuel cell system 300 according to the third embodiment of the present disclosure. Alternatively, the central column 301 may be included in either of the systems 100, 200 of the first and second embodiments. Accordingly, the central column 301 may include a number of components similar to the components previously described with respect to the systems 100, 200, which may be numbered with the same numbers as in FIGS. 1 and 2, and will not be described in detail.

In addition to the components that were described with respect to the first and second embodiments, in the system 300, the column 301 may be disposed inside a hot box 302 and a catalytic partial oxidation (CPOx) reactor 170, a CPOx blower 180 (e.g., air blower), a system blower 182 (e.g., main air blower), the anode recycle blower 205, and the mixer 207 may be disposed outside of the hotbox 302. However, the present disclosure is not limited to any particular location for each of the components with respect to the hotbox 302.

Referring to FIG. 3A, the CPOx reactor 170 receives the fuel inlet stream from a fuel inlet. The fuel inlet may be a utility gas line including a valve to control an amount of fuel provided to the CPOx reactor 170. The CPOx blower 180 may provide air to the CPOx reactor 170 during system 300 start-up, and then turned off during steady-state operating mode when the fuel cell stacks 101 reach a steady-state operating temperature above 700° C., such as 750 to 900° C. The fuel in the steady state and/or a mixture of fuel and air during start-up may be provided to the mixer 207 by the fuel inlet conduit 111.

The main air blower 182 may be configured to provide an air stream (e.g., air inlet stream) to the air preheater heat exchanger 125 through air inlet conduit 130. The ATO exhaust stream flows from the ATO 140 to the air heat exchanger (e.g., cathode recuperator) 127 through the ATO exhaust conduit 161. Exhaust flows from the air heat exchanger 127 to the steam generator 160 through the ATO exhaust conduit 161. Exhaust flows from the steam generator 160 and out of the hotbox 302 through the ATO exhaust conduit 161.

Water flows from a water source 190, such as a water tank or a water pipe, to the steam generator 160 through water conduit 163. The steam generator 160 converts the water into steam using heat from the ATO exhaust provided by the ATO exhaust conduit 161. Steam is provided from the steam generator 160 to the mixer 207 through the water conduit 163. Alternatively, if desired, the steam may be provided directly into the fuel inlet stream and/or the anode exhaust stream may be provided directly into the fuel inlet stream followed by humidification of the combined fuel streams.

The system 300 may further include a system controller 225 configured to control various elements (e.g., blowers 182, 184 and 205 and the fuel control valve) of the system 300. The controller 225 may include a central processing unit configured to execute stored instructions. For example, the controller 225 may be configured to control fuel and/or air flow through the system 300, according to fuel composition data.

Referring to FIG. 3B, the central column may extend from a base 310 upon which one or more fuel cell stacks 101 may be disposed. The fuel inlet conduit 111 and fuel exhaust conduit 153 may extend from the stacks 101, through the base 310, to the column 301.

The column 301 may include cylindrical outer and inner walls that at least partially define an ATO 140. The fuel heat exchanger 121 may be disposed around the reformer 123. An optional first additional WGS reactor 128A may be incorporated into the fuel heat exchanger 121 and/or the reformer 123 by providing the WGS catalyst in the fuel heat exchanger 121 and/or the reformer 123. The ATO 140 may surround the fuel heat exchanger 121. The fuel cell stacks 101 may surround the ATO 140, and the air heat exchanger 127 (shown in FIG. 3A) may surround the fuel cell stacks 101 in the hot box 302.

The WGS reactor 128 is disposed above the fuel heat exchanger 121. The air preheater heat exchanger 125 is disposed above the WGS reactor 128. An optional second additional WGS reactor 128B may be incorporated into the air preheater heat exchanger 125 by providing the WGS catalyst in the air preheater heat exchanger 125.

The fuel exhaust conduit 153 may fluidly connect the fuel cell stacks 101, the fuel heat exchanger 121, the WGS reactor 128, and the air preheater 125. Accordingly, a fuel exhaust stream output from the stacks 101 may flow into the bottom of the column 301, along the outer surface of the fuel heat exchanger 121, and then may flow inside of the WGS reactor 128 and the air preheater heat exchanger 125, before exiting the top of the column 301.

The fuel inlet conduit 111 may fluidly connect the stacks 101, the fuel heat exchanger 121, and the fuel reformer 123 to the fuel inlet. Accordingly, a fuel inlet stream may flow into the top of the column 301, and then be provided to the fuel heat exchanger 121 and the fuel reformer 123, before exiting the bottom of the column 301 and being provided to the stacks 101.

For example, the fuel heat exchanger 121 may include a corrugated separator configured to separate the fuel inlet stream from the fuel exhaust stream. In some embodiments, a surface of the fuel heat exchanger 121 that contacts the fuel exhaust may be coated with a WGS catalyst, such that the fuel heat exchanger 121 may operate as a combined fuel heat exchanger 121 and WGS reactor 128A. In other words, the fuel heat exchanger 121 may operate to both transfer heat between the fuel inlet and fuel exhaust streams, as well as convert water and carbon monoxide in the fuel exhaust into free hydrogen and carbon dioxide. As such, an additional volume in the column 301 may be dedicated to WGS reactions, in order to increase WGS reactivity.

In some embodiments, the column 301 may include the splitter 201 configured to divert a portion of the fuel exhaust stream to the ATO 140. A remainder of the fuel exhaust stream may be cooled in the air preheater heat exchanger 125 to temperature compatible with any further processing. The air preheater heat exchanger 125 conduits which carry the fuel exhaust stream may optionally be coated in with a WGS catalyst to allow the heat exchanger 125 to perform as an optional second additional WGS reactor 128B, if further reduction in carbon monoxide content and conversion of water to hydrogen is desired.

Another optional embodiment shown in FIG. 3A includes an electrochemical pump separator 150 with an integrated third additional WGS reactor catalyst. In one aspect of this optional embodiment, the anode catalyst described above is also a WGS catalyst. In another aspect of this optional embodiment, the WGS catalyst may be coated on the entire anode of the electrochemical pump separator 150 or on a portion of the anode of the electrochemical pump separator 150. In another aspect of this optional another embodiment, the WGS catalyst is located in the same housing as the electrochemical pump separator 150 such that there is no air pre-heater 125 located between the electrochemical pump separator 150 and the WGS catalyst. For example, the WGS catalyst may be coated on a surface of the anode chamber of the housing containing the electrochemical pump separator 150, such that the fuel exhaust stream passes by the WGS reactor catalyst before reaching the anode of the electrochemical pump separator 150. The WGS reactor catalyst may comprise, PtRu, Cu, Cu—Zn, Cu—Zn—Al, Pt, Pt—Ni, Ni, Fe—Cr, or Fe—Cr—Cu. The WGS reactor catalyst may have an operating temperature of about 200-450° C., such as about 200-250° C., which may be desirable for maximizing conversion of carbon monoxide and water into usable hydrogen (plus waste carbon dioxide).

Proton Exchange Membrane (PEM) Cells

Carbon monoxide ("CO") is a poison for many hydrogen pump materials, substantially increasing the pumping voltage (power). Traditionally, binary catalysts, such as Pt—Ru, are employed for CO tolerance in proton exchange membrane ("PEM", also known as polymer electrolyte membrane) fuel cells and exhibit suitable performance at CO concentrations of less than 100 ppm. However, the performance of such catalysts may be significantly degraded at higher CO concentrations. In addition, an air bleed is generally necessary to ensure stable performance.

Fuel cell systems, such as the systems of FIGS. 1, 2, 3A, and 3B may generate a fuel cell fuel exhaust stream that contains a significant fraction of CO, such as reformate from the steam-reformation of natural gas used as the fuel. For example, a fuel exhaust may have a CO concentration of above 100 ppm, such as 150 to 900 ppm.

Accordingly, various embodiments of the present disclosure provide a PEM cell that includes a membrane electrode assembly (MEA) that is capable of stably operating as a hydrogen pump, when supplied with a hydrogen-containing gas having CO concentration of above 100 ppm.

Figure 4:
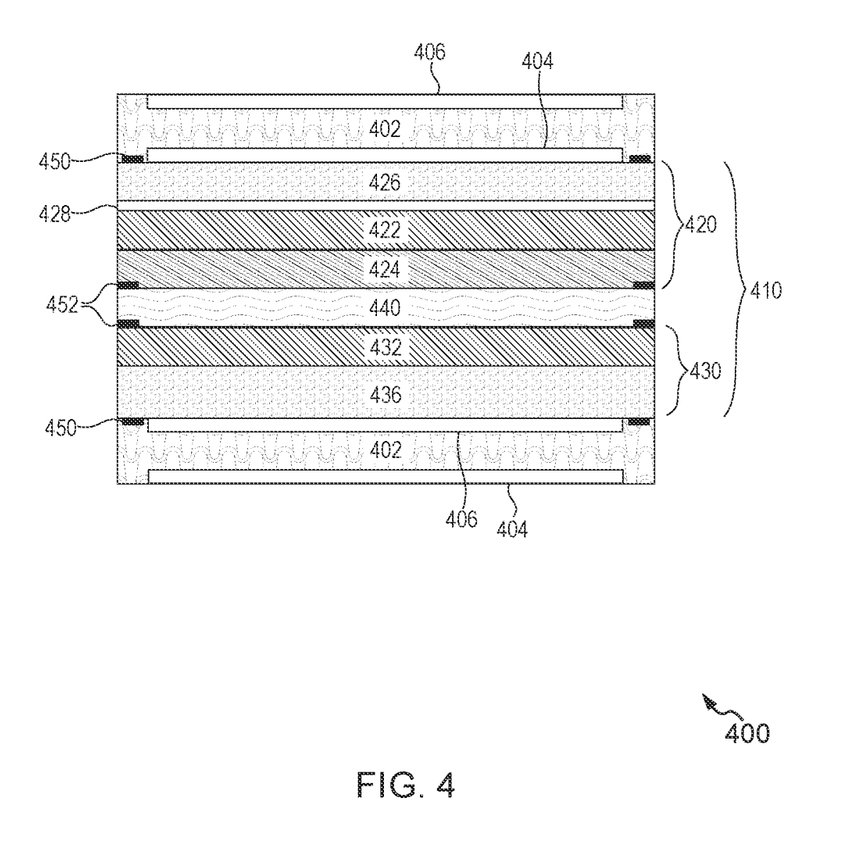
FIG. 4 is a schematic side cross-sectional perspective view of a PEM electrochemical cell, according to various embodiments of the present disclosure.

FIG. 4 is a cross-sectional view of a PEM electrochemical cell 400, according to various embodiments of the present disclosure. On or more of the PEM cells 400 may be included in the pump separators 150 of FIGS. 1, 2, and 3A.

Referring to FIG. 4, the PEM cell 400 may include a membrane electrode assembly (MEA) 410, which may be disposed between flow field plates (e.g., bipolar plates) 402. The MEA 410 may include a polymer electrolyte membrane 440 disposed between an anode 420 and a cathode 430. In some embodiments the anode 420 may include an anode gas diffusion layer (GDL) 426, and the cathode 430 may include a cathode GDL 436. The anode GDL 426 may be configured to distribute a hydrogen-containing gas, such a fuel cell fuel exhaust stream from the SOFC stacks 101 shown in FIG. 3A, to the anode 420. The cathode GDL 436 may be configured to collect hydrogen which is diffused from the anode 420 through the electrolyte membrane 440 to the cathode 430.

As discussed below in more detail, the anode 420 may include one or more layers of catalyst particles that are deposited on (e.g., loaded on and/or coated on) the anode GDL 426, and the cathode 430 may include one or more layers of catalyst particles that are deposited on (e.g., loaded on and/or coated on) the cathode GDL 436 to form respective gas diffusion electrodes (GDE). Accordingly, the anode 420 may be referred to as a gas diffusion anode 420, and the cathode 430 may be referred to as a gas diffusion cathode 430. Alternatively, the anode and/or the cathode catalyst particle layers may be deposited on the membrane 440 instead of the anode GDL 426 and the cathode GDL 436, and/or deposited on both the membrane 440 and at least one of the anode GDL 426 and the cathode GDL 436.

The flow field plates 402 may include an inlet flow field 404 configured to provide the hydrogen-containing gas to the anode GDL 426, and an outlet flow field 406 configured to receive hydrogen gas from the cathode GDL 436. In particular, the inlet flow field 404 and/or the outlet flow field 406 may include flow channels configured to control pressure and/or reactant concentrations at the membrane 440, in conjunction with the anode and cathode GDLs 426, 436.

The anode and cathode GDLs 426, 436 may be formed of materials configured to reduce mass transfer loss, provide high electrical conductivity, and effectively manage water transport. For example, the anode and cathode GDLs 426, 436 may include a porous base material, such as a porous carbon material, for example, carbon paper, carbon cloth, carbon felt, or a combination thereof, to provide electrical conductivity and effective mass transfer. The anode and/or cathode GDLs 426, 436 may also include a hydrophobic material, such as polytetrafluoroethylene (PTFE). For example, the base material of the anode GDL 426 may be loaded with from about 5 weight percent ("wt %") to about 50 wt %, such as from about 10 wt % to about 30 wt % PTFE.

In some embodiments, anode and cathode GDLs 426, 436 may optionally be in the form of, or include, a microporous layer. In various embodiments, the anode and cathode GDLs 426, 436 may include multiple stacked layers to match the functionalities of the anode 420 and the cathode 430. The anode and cathode GDLs 426, 436 may be formed from sheets, rolls, foils, or the like, according to the requirements of a manufacturing process.

In some embodiments, the anode 420 may include a microporous layer 428 deposited on a surface of the anode GDL 426 that faces the membrane 440. The microporous layer 428 may include a hydrophobic material, such as PTFE, or a mixture of a hydrophobic material and an electrically conductive material, such as carbon black. The microporous layer 428 may be configured to improve anode water management. In some embodiments, the anode 420 may include the anode GDL 426, the microporous layer 428 and a single anode layer (e.g., a single anode catalyst layer) 422 or 424. In another embodiment, the cathode 430 may also include a microporous layer in addition to the microporous layer 428 of the anode or instead of the microporous layer 428 of the anode.

The membrane 440 may include any suitable proton conducting membrane, such as a proton exchange membrane. The membrane 440 may include ionomers, such as a sulfonated tetrafluoroethylene-based fluoropolymer-copolymer having a chemical formula: $C_7HF_{13}O_5S \cdot C_2F_4$ sold under the brand name Nafion®. Alternatively, the membrane 440 may include a phosphoric acid membrane such as a polybenzimidazole (PBI)-based phosphoric acid membranes comprising poly-phosphoric acid and polybenzomidazole polymer), proton conducting oxides include phosphates such as $LaPO_4$, solid acids (such as cesium dihydrogen phosphate, $CsH_2PO_4$), and certain perovskite ($ABO_3$) materials such as perovskite type cerates, niobates, phosphates, gallates or zirconates, such as BaCeYO (BCO), BaZrYO (BZO), LaSrPO, BaCaNbO (BCN), LaCaNbO, or LaBaGaO (LBGO) those described in Chem. Soc. Rev., 2010, 39, 4370-4387, incorporated herein by reference in its entirety.

The PEM cell 400 may be operated in a hydrogen pumping mode (i.e., as an electrolyzer), where an external voltage potential is applied between the anode 420 and cathode 430, while the fuel exhaust is provided to the anode side may dissociate into protons and electrons. The electrons may be externally routed to the cathode 430, and the protons may be transported (i.e., pumped) through the membrane 440 to the cathode 430, where the hydrogen ions recombine with electrons, resulting in hydrogen evolution.

The fuel cell exhaust provided to the cell 400 may have a CO concentration of above 100 ppm. Accordingly, the MEA 410 may be configured to tolerate such CO concentrations. In particular, the anode 420 may be configured to tolerate long term exposure to CO concentrations of above 100 ppm, without the need to utilize an air bleed. However, if desired, an air bleed may be added to the fuel exhaust provided to the anode 420.

According to various embodiments, the anode 420 and/or cathode 430 may include catalyst particles comprising one or more catalyst metals, such as Pt, Ru, Ni, Rh, Mo, Co, Ir, Fe, and/or other d block metals including partially filled 3d orbitals. For example, the catalyst particles may include elemental metals or alloys comprising Ag, Al, Au, Co, Cr, Cu, Fe, Ir, Mo, Ni, Pd, Pt, Ru, Rh, W, Zn, or any combination thereof. For example, the anode catalyst particles may include alloy catalyst such as Pt—Ru, Cu—Zn, Cu—Zn—Al, Pt—Ni, Fe—Cr, or Fe—Cr—Cu.

The catalyst particles may each include a single catalyst metal, or an alloy of catalyst metals. In some embodiments, the anode may include catalyst particles that may include different catalyst metals and different particle sizes. For example, the catalyst particles may range from several nanometers to less than a micron in average particle size. In some embodiments, the catalyst particles may include a core-shell configuration, with a catalyst metal shell and a different (e.g., less expensive) metal or material as a core, in order to improve catalytic efficiency and reduce costs.

In some embodiments, the anode 420 may include Pt as a primary catalyst for hydrogen pumping (e.g., proton generation) and may include Ru, Ni, Rh, etc. as a secondary catalyst for promoting the oxidation of CO and the suppression of the reverse water gas shift reaction of $CO_2$.

The anode 420 and/or cathode 430 may include one or more support materials that may be loaded with the catalyst particles. Catalyst support materials may be selected to provide for reduced catalysts loading, increased electrical conductivity, and better electrode printing characteristics. Common support materials may include carbon-based materials, such as carbon black (e.g., Vulcan XC 72R carbon powder, or a Ketjen Black powder), graphite powder, graphene, carbon nanotubes (CNTs), nano-horns, carbon fiber, carbon whiskers, or the like. In other embodiments, catalyst support materials may include non-carbon-based materials, such carbides, oxides, and nitrides of metals such as W, Ti, Mo, or the like.

In some embodiments, the anode and cathode 420, 430 may have a catalyst particle loading ranging from about 0.05 mg/cm$^2$ to about 3 mg/cm$^2$, such as from about 0.1 mg/cm$^2$ to about 2 mg/cm$^2$. In particular, the anode 420 may have a catalyst particle loading of from about 0.1 mg/cm$^2$, to about 3 mg/cm$^2$, such as from about 0.1 mg/cm$^2$, to about 2 mg/cm$^2$. The cathode 430 may have a catalyst particle loading ranging from about 0.05 mg/cm$^2$, to about 1 mg/cm$^2$, such as from about 0.05 mg/cm$^2$, to about 0.5 mg/cm$^2$.

In various embodiments, the anode 420 and/or cathode 430 may include a bonding agent. For example, the bonding agents may include a hydrophobic bonding agent such as PTFE and/or ionomer bonding agents such as Nafion®. The anode 420 and/or the cathode 430 may include from about 5 wt % to about 50 wt %, such as from about 10 wt % to about 40 wt %, or from about 10 wt % to about 30 wt %, of a bonding agent or combination of bonding agents.

According to various embodiments, the anode 420 may include a single layer or may be a multilayered anode including two, three, or more layers. For example, as shown in FIG. 4, the anode 420 may have a bilayer configuration including a first anode catalyst layer 422 (e.g., first anode catalyst sub-layer) contacting the anode GDL 426 and comprising first catalyst particles configured to preferentially catalyze the electrochemical oxidization of CO to form $CO_2$, and a second anode catalyst layer 424 (e.g., second anode catalyst sub-layer) contacting the membrane 440 and comprising second catalyst particles configured to preferentially catalyze the generation of hydrogen ions (i.e., protons) from $H_2$.

The first anode catalyst layer 422 may be bonded to the anode GDL 426, while the second anode catalyst layer 424 (e.g., second sub-layer) may be bonded to the membrane 440 in a bilayer anode 420. If additional anode layers are present in the anode 420, then the first anode catalyst layer 422 is generally located between the second anode catalyst layer 424 and the anode GDL 426, while the second anode catalyst layer 424 is generally located between the first anode catalyst layer 422 and the electrolyte membrane 440.

In some embodiments, the first anode catalyst layer 422 may have a higher catalyst particle loading than the second anode catalyst layer 424. In some embodiments, the loading amounts of the catalyst particles in the first and second anode layers 422, 424 may vary in a thickness direction perpendicular to the membrane 440.

In various embodiments, the first anode catalyst layer 422 may include the first catalyst particles and a hydrophobic bonding agent such as PTFE or the like. The hydrophobic bonding agent may be configured to control the water content of the first anode catalyst layer 422. For example, the first anode catalyst layer 422 may include from about 5 wt % to about 50 wt %, such as from about 10 wt % to about 40 wt %, or from about 10 wt % to about 30 wt %, of the hydrophobic bonding agent such as PTFE.

The first catalyst particles may include catalyst metals or metal alloys as described above. For example, the first catalyst particles may comprise a Pt—Ru alloy particles having a Pt:Ru atomic ratio ranging from about 60:40 to about 40:60, or about 50:50. In some embodiments, the first anode catalyst layer 422 may include the first catalyst particles, such as Pt—Ru alloy particles, at a loading ranging from about 0.3 mg/cm$^2$ to about 1.2 mg/cm$^2$, such as from about 0.8 mg/cm$^2$ to about 1.2 mg/cm$^2$, from about 0.9 mg/cm$^2$ to about 1.1 mg/cm$^2$, or about 1 mg/cm$^2$.

The first anode catalyst layer 422 may be configured to preferentially oxidize carbon monoxide via, for example, the water gas shift reaction. Accordingly, the first anode layer may be configured to reduce CO poisoning of the second anode catalyst layer 424.

The second anode catalyst layer 424 may include second catalyst particles having a composition different from the first catalyst particles and an ionomer bonding agent. The second catalyst particles may include catalyst metals or metal alloys as described above. For example, the second catalyst particles may comprise a Pt—Ru alloy particles having a Pt:Ru atomic ratio ranging from about 55:45 to about 70:30, or about 66:33. In one embodiment, if both the first and the second anode layers comprise the Pt—Ru alloy catalyst particles, then the Pt—Ru catalyst particles in the second anode catalyst layer 424 may have a higher Pt:Ru atomic ratio than the Pt—Ru catalyst particles in the first anode catalyst layer 422. The second anode catalyst layer 424 may include an ionomer bonding agent such as Nafion®. However, the present disclosure is not limited to any particular ionomer bonding agent. In various embodiments, the second anode catalyst layer 424 may include the second catalyst particles, such as Pt—Ru alloy particles, at a loading ranging from about 0.3 mg/cm$^2$ to about 1.2 mg/cm$^2$, such as from about 0.5 mg/cm$^2$ to about 0.9 mg/cm$^2$, from about 0.6 mg/cm$^2$ to about 0.8 mg/cm$^2$, or about 0.7 mg/cm$^2$.

In some alternative embodiments, the first and second anode layers 422, 424 may include catalyst particles having similar Pt:Ru atomic ratios or the same Pt:Ru atomic ratio. For example, the first and second anode layers 422, 424 may include catalyst particles having a Pt:Ru atomic ratio ranging from about 90:10 to about 10:90, such as from about 80:20 to about 20:80, or from about 70:30 to about 30:70.

The cathode 430 may include a third catalyst layer 432 disposed on a between the cathode GDL 436 and the membrane 440. The third catalyst layer 432 may include third catalyst particles and an ionomer bonding agent. The third catalyst particles may include catalyst metals or metal alloys as described above. For example, the third catalyst particles may include Pt or a Pt alloy. The third catalyst layer 432 may also include a catalyst support comprising a carbon-based material or a metal oxide, nitride, or carbide material, as described above. In some embodiments the third catalyst layer 432 may include Pt catalyst particles supported by a carbon-based material and bonded with an ionomer bonding agent, such as Nafion®. The third catalyst layer 432 may include the third catalyst particles, such as Pt particles, at a loading ranging from about 0.025 mg/cm$^2$ to about 0.75 mg/cm$^2$, such as from about 0.05 mg/cm$^2$ to about 0.5 mg/cm$^2$.

When a voltage potential is applied between the cathode 430 and the anode 420, the second anode catalyst layer 424, the membrane 440, and the cathode 430 may be configured to operate as a hydrogen pump. In particular, hydrogen ions generated at the second anode catalyst layer 424 may be transported through the membrane 440 by a potential difference applied between the anode 420 and the cathode 430, and the hydrogen ions may then be recombined in the cathode 430 to generate hydrogen gas ($H_2$).

In other embodiments, the anode 420 may include a single layer structure including the first catalyst particles, the second catalyst particles, the ionomer, and PTFE. For example, the anode 420 may include the microporous layer 428 and a single catalyst layer (422 or 424) disposed between the microporous layer 428 and the membrane 440. Relative amounts of the first catalyst particles and the second catalyst particles vary from 0:1 to 1:0, in a thickness direction of the anode 420, taken in a direction perpendicular to a plane of the membrane 440. For example, the anode 420 may have a relatively high concentration of the first catalyst particles adjacent to the anode GDL 426 and a relatively low concentration of the first catalyst particles adjacent to the membrane 440, and the anode 420 may have a relatively high concentration of the second catalyst particles adjacent to the membrane 440 and a relatively low concentration of the second catalyst particles adjacent to the anode GDL 426. In other words, the relative amounts of Pt and Ru in the anode 420 may vary in the thickness direction of the anode 420, such that the anode 420 has a lower Pt:Ru ratio adjacent to the anode GDL 426 and a higher Pt:Ru ratio adjacent to the membrane 440. For example, the Pt:Ru ratio may range from 90:10 to 10:90, in the thickness direction, in some embodiments.

In some embodiments, the relative amounts of the ionomer and PTFE may vary from 0:1 to 1:0, in a thickness direction of the anode 420, taken in a direction perpendicular to a plane of the membrane 440. In some embodiments, the anode 420 may include a 50:50 weight ratio of ionomer and PTFE. The ionomer and PTFE may be bonded together as a dual bonding agent. The anode 420 may optionally include a micro porous layer including PTFE and/or an ionomer.

Electrode Ink Compositions and MEA Formation Methods

In various embodiments, at least one of the anode 420 and/or the cathode 430 catalyst layers 422, 424 and 432, respectively, may be formed by depositing corresponding anode and/or cathode inks on the respective anode and cathode GDLs 426, 436 to form respective GDEs. If the microporous layer 428 is present, then the anode catalyst layer or layers 422 and/or 424 may be deposited on the microporous layer 428. Alternatively, one or both of the inks may be deposited on the membrane 440.

The microstructure of an anode or cathode electrode (e.g., catalyst dispersion, porosity, and tortuosity) may be important in determining the functional performance of an MEA. In order to form a bi-layer electrode having different bonding agents in each layer of the bi-layer electrode, different electrode ink compositions may be used for each layer and/or different methods may be used by which an electrode ink is formed, applied, and/or processed after being applied.

According to various embodiments, the electrode inks may include a solids component dispersed in a liquid carrier. The solids component may include catalyst particles, a bonding component (i.e., bonding agent), and optionally a catalyst support component. The carrier may include one or more solvents and optionally one or more stabilizer components. The solvents may include organic solvents, inorganic solvents, water, or a combination thereof. The stabilizer component may include one or more surfactants and/or one or more simple organic ligands.

The carrier may be formed of materials selected to provide stability to the electrode ink. For example, the carrier may include one or more solvents and/or stabilizers configured to suspend the solids component as a colloidal suspension. In particular, the solvents and/or stabilizers may be chosen in view of stably suspending micron or nanometer size catalyst particles having a high surface area and a low solid loading amount, as well as a solubility of the bonding agents. In some embodiments, the components of the carrier may be selected based on desired catalyst loading amounts, desired ink wetting performance and/or based on the desired electrical performance of an electrode formed from the electrode ink.

In various embodiments, the electrode inks may include the solids component in an amount ranging from about 2 wt % to about 20 wt %, based on a total weight percent of the electrode ink. The electrode ink may include the carrier in an amount ranging from about 5 wt % to about 50 wt %, based on a total weight percent of the electrode ink.

Suitable catalyst particles may include one or more catalyst metals, such as Pt, Ru, Ni, Rh, Mo, Co, Ir, Fe, and/or other d block metals including partially filled 3d orbitals, as described above. For example, the catalyst particles may include elemental metals or alloys comprising Ag, Al, Au, Co, Cr, Cu, Fe, Ir, Mo, Ni, Pd, Pt, Ru, Rh, W, Zn, or any combination thereof. For example, the anode catalyst particles may include alloy catalyst such as Pt—Ru, Pt—Co, Pt—Mn, Cu—Zn, Cu—Zn—Al, Pt—Ni, Fe—Cr, or Fe—Cr—Cu. In some embodiments, the catalyst particles may comprise a Pt—Ru alloy particles having a Pt:Ru atomic ratio ranging from about 70:30 to about, 30:70, about 60:40 to about 40:60, or about 50:50.

The catalyst particles may each include a single catalyst metal, or an alloy of catalyst metals. In some embodiments, the anode catalyst layers may include catalyst particles that may include different catalyst metals and/or different particle sizes. For example, the catalyst particles may range from several nanometers to less than a micron, such as 10 nm to 900 nm, in average particle size. In some embodiments, the catalyst particles may include a core-shell configuration, with a catalyst metal shell and a different (e.g., less expensive) metal or material as a core, in order to improve catalytic efficiency and reduce costs.

In various embodiments, an electrode ink may include the catalyst particles, such as Pt—Ru alloy particles, in an amount ranging from about 30 wt % to about 100 wt %, based on the total weight of the solids component. In some embodiments, the catalyst particles may be functionalized with organic ligands (e.g., may include a functionalized surface layer) in order to improve solubility in an electrode ink and/or ink solvent.

The bonding component may include hydrophobic polymer bonding agents, such as PTFE or the like, and/or ionomer bonding agents, such as a sulfonated tetrafluoroethylene-based fluoropolymer-copolymer having a chemical formula $C_7HF_{13}O_5S \cdot C_2F_4$ sold under the brand name Nafion®, or the like. In some embodiments, the bonding component may represent from about 5 wt % to about 50 wt %, such as from about 10 wt % to about 40 wt %, or from about 10 wt % to about 30 wt % of a solids content of the electrode ink.

The catalyst support component may include one or more support materials configured to provide reduced catalysts loading, increased electrical conductivity, and better electrode printing characteristics. Common support materials may include carbon-based materials, such as carbon black (e.g., Vulcan XC 72R carbon powder, or a Ketjen Black powder), graphite powder, graphene, carbon nanotubes (CNTs), nano-horns, carbon fiber, carbon whiskers, or the like. In other embodiments, catalyst support materials may include non-carbon-based materials, such carbides, oxides, and nitrides of metals such as W, Ti, Mo, or the like.

Solvent properties may impact the performance and/or manufacturability of an electrode formed from a corresponding electrode ink. For example, solvents may be selected based on a desired polarity, vapor pressure, dielectric constant, viscosity, stability, and/or boiling point thereof. Solvents may also be selected based on a desired ink wetting behavior when the ink is applied to a GDL.

Suitable solvents may include organic solvents, such as alcohols, ethers, esters, ketones, acids, amines, glycols, glymes, glycerols, combinations thereof, of the like. For example, in some embodiments, an electrode ink solvent may include glycerol, ethylene glycol, propylene glycol, N-methyl-2-pyrrolidone (NMP), isopropyl alcohol (IPA), methyl ethyl ketone (MEK), methyl isobutyl ketone (MIBK), acetone, ethyl lactate, diglyme, propylene glycol monomethyl ether acetate (PGMEA), butyl acetate, heptanol, combinations thereof, or the like. The organic solvent or combination thereof may be used alone, or may be mixed with other solvents and/or water at a ratio that may be selected to attain desirable dispersion and/or surface wetting characteristics. In various embodiments, an electrode ink may include one or more of the solvents in an amount ranging from about 5 wt % to about 50 wt %, based on the total weight of the electrode ink.

The stabilizer may be selected based on catalyst particle size, surface area, loading amount, and/or based on the nature of solvents included in the electrode ink. In some embodiments, electrode ink stabilizer may have a burn-off temperature that is less than or equal to a sintering temperature of an electrode layer formed by the electrode ink. Sintering temperatures may depend upon the type of catalyst and the thermal stability of an associated bonding component. For example, the hydrophobic bonding agents, such as PTFE may have a higher thermal stability than the ionomer bonding agents, such as Nafion®.

The stabilizer may include one or more surfactants and/or one or more simple organic ligands. Electrode ink surfactants may include cationic, anionic, amphoteric, and/or non-ionic surfactants. For example, suitable surfactants may include sodium dodecyl sulfate (SDS), sodium laureth sulfate (SLS), cetyltrimethylammonium bromide (CTAB), polyethylene glycol (PEG) derivatives (e.g., narrow range ethoxylates), fluorosurfactants, combinations thereof, or the like. Suitable simple organic ligands may include thiols, amines, acids, phosphines, polyols, combinations thereof, or the like. In various embodiments, an electrode ink may include less than 2 wt % of the stabilizer, such as from 0.25 wt % to about 1 wt %, or about 0.5 wt %, based on a total weight of the electrode ink.

Electrode inks may be formed using any suitable mixing process, such as ultrasonication, magnetic stirring, ball milling, planetary milling, high pressure mixing, mechanical mixing, other mechanical mixing methods, combinations thereof, or the like. In some embodiments, the solids component may be dispersed in the carrier of an electrode ink using magnetic stirring and ultrasonication.

The present inventors realized that alcohol-based solvents, such as IPA, may react with catalyst particles and/or polymerize hydrophobic polymer bonding agents, such as PTFE. Accordingly, in one embodiment, electrode inks including alcohol-based or alcohol containing solvents may also include water, a combination of alcohol-based and non-alcohol-based solvents and/or a bonding component (i.e., agent) that includes both an ionomer (e.g., a hydrophilic ionomer) and a hydrophobic polymer bonding agent.

In various embodiments, multi-layer anodes may be formed using two or more different anode inks. For example, to form the bilayer anode 420, a first anode ink may be used to form the first anode catalyst layer 422, and a second anode ink may be used to form the second anode catalyst layer 424.

The solids component of the first anode ink may include first catalyst particles, a hydrophobic bonding agent, such as PTFE, and an ionomer bonding agent, such as a sulfonated tetrafluoroethylene-based fluoropolymer-copolymer having a chemical formula $C_7HF_{13}O_5S \cdot C_2F_4$ sold under the brand name Nafion®. The solids component of the first anode ink may also include an optional catalyst support component.

While not wishing to be bound to any particular theory, it is believed that sintering of the first anode ink at a relatively high temperature (e.g., the polymer bonding agent sintering temperature) may result in the loss of functional chains from the molecular backbone of the ionomer bonding agent (e.g., Nafion®) included in the first anode ink. As a result, the Nafion® in the first anode catalyst layer 422 may be left with a backbone having a similar structure to the PTFE hydrophobic bonding agent. Thus, the different bonding agents in the first anode catalyst layer would not have significantly different properties from each other after the sintering. Furthermore, adding the ionomer bonding agent to the first anode ink in addition to the hydrophobic polymer bonding agent, such as PTFE, allows the use of an alcohol-based or alcohol containing solvent without significantly polymerizing the hydrophobic bonding agent, such as PTFE, or reacting with the catalyst particles.

The solids component of the second anode ink may include second catalyst particles, an ionomer bonding agent, such as the sulfonated tetrafluoroethylene-based fluoropolymer-copolymer having a chemical formula $C_7HF_{13}O_5S \cdot C_2F_4$ sold under the brand name Nafion®, and an optional catalyst support component. The solids component of the cathode ink may include third catalyst particles, an ionomer bonding agent, and an optional catalyst support component.

The first, second, and third catalyst particles may include catalyst particles as described above. For example, the first and second catalyst particles may include a Pt and Ru catalyst, and the third catalyst particles may include a Pt catalyst. However, the first and second catalyst particles may have different Pt:Ru atomic ratios. For example, the first catalyst particles may have a Pt:Ru atomic ratio ranging from about 60:40 to about 40:60, or about 50:50, and the second catalyst particles may have a Pt:Ru atomic ratio ranging from about 55:45 to about 70:30, or about 66:33. In particular, the second catalyst particles may have a higher Pt:Ru atomic ratio than the first catalyst particles. Alternatively, the first, second and third catalyst particles may comprise different metals or alloys from each other. For example, at least one of the first, second and third catalyst particles may comprise Pt—Ru alloy catalyst particles, and at least one other one of the first, second and third catalyst particles may comprise Pt—Mo and/or Pt—Co alloy catalyst particles.

In some embodiments, the first and second anode inks, and the cathode ink may include a carrier comprising water, ethyl lactate (which contains OH groups bound to a saturated carbon atom and may be considered an alcohol-based or alcohol containing solvent), and PGMEA, for example. The amount of water and the stabilizer component in the carrier may be set to disperse both Nafion® and PTFE in the carrier.

The MEA 400 may be formed using the anode and cathode inks. The inks may be dispensed directly onto MEA substrates, such as onto the GDL or onto the polymer membrane. Electrode inks may be dispensed using any technique that can produce a uniform layer of catalyst particles on the intended substrate. For example, suitable dispensing processes may include brushing, rod coating, screen printing, ultrasonic spraying, air spraying, roll to roll coating, slot die coating, or the like. In other embodiments, the inks may be dispensed on a separate substrate, dried and/or sintered to form a catalyst decal, which may be transferred to an MEA substrate. In some embodiments, MEAs may be manufactured using a combination of the above processes.

In one embodiment, the first anode ink may be deposited on the first GDL 426, air-dried, and heat-treated (e.g., sintered) to form the first anode catalyst layer 422. For example, the first anode ink may be air-dried at room temperature, for from about 10 minutes to about an hour, and then heated at a first temperature ranging from about 280° C. to about 420° C., such as from about 300° C. to about 400° C., from about 325° C. to about 375° C., or about 350° C., for a time period ranging from about 15 minutes to an hour, such as about 30 minutes. This high temperature sintering may result in the loss of functional chains from the molecular backbone of the ionomer bonding agent (e.g., Nafion®) included in the first anode ink. As a result, the Nafion® in the first anode catalyst layer 422 may be left with a backbone having a similar structure to the PTFE hydrophobic bonding agent. In various embodiments, the heating may be conducted in an inert atmosphere or in an active atmosphere (e.g., a reducing or oxidizing atmosphere), in order to activate the first catalyst particles.

The first anode ink may include the first catalyst particles, and ionomer bonding agent (e.g. Nafion®), and a hydrophobic bonding agent (e.g., PTFE), and optionally a catalyst support, dispersed in a carrier. In some embodiments, the first anode ink may be dispensed using rod coating. The carrier may comprise water, ethyl lactate, PGMEA, and/or an optional stabilizer component, for example. The amounts of water, ethyl lactate, PGMEA, and/or stabilizer in the carrier may be configured to disperse both Nafion® and PTFE in the carrier.

The second anode ink may then be deposited on the first anode catalyst layer 422, air-dried, and sintered to form the second anode catalyst layer 424. For example, the second anode ink may be air-dried at room temperature, for from about 10 minutes to about an hour, and then heated at a second temperature ranging from about 50° C. to about 80° C., such as from 55° C. to about 65° C., or about 60° C., for a time period ranging from about 8 hours to about 14 hours, such as about 12 hours. The second temperature is lower than the first temperature, but the second heating step is longer than the first heating step. The relatively lower heating temperature of this step may preserve the structure of the Nafion® bonding agent in the second anode catalyst layer 424, such that the ionomer does not result in the loss of functional chains from the molecular backbone. In various embodiments, the sintering may be conducted in an inert atmosphere or in an active atmosphere (e.g., a reducing or oxidizing atmosphere), in order to activate the second catalyst particles.

The cathode ink may be applied to the GDL 436, air-dried, and sintered to form the cathode 430. For example, the cathode ink may be air-dried at room temperature, for from about 10 minutes to about an hour, and then heated at a temperature ranging from about 50° C. to about 80° C., such as from 55° C. to about 65° C., or about 60° C., for a time period ranging from about 8 hours to about 14 hours, such as about 12 hours. In various embodiments, the heating may be conducted in an inert atmosphere or in an active atmosphere (e.g., a reducing or oxidizing atmosphere), in order to activate the third catalyst particles. The cathode ink may be applied before, after, or during the application of the first and/or second anode inks.

In some embodiments, electrode layers that include an ionomer as a bonding agent, such as the cathode 430 and/or the second anode catalyst layer 424, may be manufactured on separate supports. The second anode catalyst layer 424 may be removed from the support and applied/bonded to the first anode catalyst layer 422 by a decal lamination process, after the first anode catalyst layer 422 is bonded to the anode GDL 426 (or the microporous layer 428 on the anode GDL 426, if present). In other embodiments, the second anode catalyst layer 424 may be removed from the support and applied/bonded to the membrane 440, by a decal lamination process. In some embodiments, the cathode 430 may be removed from the support and applied/bonded to the cathode GDL 436 by a decal lamination process.

In other embodiments, the second anode catalyst layer 424 and/or the cathode 430 catalyst layer 432 may be removed from their respective supports and bonded to opposing sides of the membrane 440. The first anode catalyst layer 422 may be bonded to the anode GDL 426, and then disposed on the second anode catalyst layer 424, by disposing the anode GDL 426 on the membrane 440, and the cathode GDL 436 may be disposed on the cathode 430 catalyst layer 432.

In other embodiments, the anode 420 may be formed by depositing the second anode ink on the membrane 440, and then drying and sintering the second anode ink to form the second catalyst layer 424, which may be bonded the membrane 440. The first anode ink may be deposited on an anode side of the anode GDL 426 (or the microporous layer 428, if present), and then dried and sintered to form the first catalyst layer 422, which may be bonded to the second catalyst layer 424. The cathode 430 catalyst layer 432 may be formed by depositing the cathode ink on the cathode GDL 436 or a cathode side of the membrane 440.

In various embodiments, the cell 400 may include gaskets 450 disposed on opposing sides of the MEA 410. For example, the gaskets 450 may be disposed in grooves formed in the flow field plates 402. The gaskets 450 may be formed of PTFE, ethylene propylene diene monomer (EPDM) rubber, silicon, fluorinated-silicon, fluorine rubber, fluorinated carbon-based synthetic rubber, or the like. The gaskets 450 may be flat gaskets or may be formed by dispensing a gasket material using a liquid injection molding process or the like.

In various embodiments, the MEA 410 may include one or more optional sub-gaskets 452. The sub-gaskets 452 may be disposed on the membrane 440 and may be configured to at least partially define an active area of the membrane 440. The sub-gaskets 452 may be single or multi-layered structures that are bonded to the membrane 440. For example, the sub-gaskets 452 may be mechanically bonded, thermally bonded, or adhesion bonded to the membrane 440 and/or the anode and cathode 420, 430. The sub-gaskets 452 should be formed of a material that is compatible with the gaskets 450 and membrane 440 under operating conditions. For example, the sub-gaskets 452 may be formed of PTFE, polyamide, polyimide, polyphenylene sulfide, polyethylene napthalate, polysulfone, polysupersulfone, polyethylene terephthalate, or the like. The thickness of the sub-gaskets 452 may be determined in conjunction with the thicknesses of other elements of MEA 410, such as the thicknesses of the membrane 440, anode and cathode GDLs 426, 436, anode 420, cathode 430, and gaskets 450.

In various embodiments, the MEA 410 may be assembled by disposing the membrane 440 between the anode GDL 426 and the cathode GDL 436, such that the cathode 430 contacts a first side (e.g., cathode side) of the membrane 440 and the second anode catalyst layer 424 contacts an opposing second side (e.g., anode side) of the membrane 440. The sub-gaskets may be disposed on the membrane 440 during the assembly process.

The assembled MEA 410 may then hot-pressed to bond the membrane 440, anode 420, cathode 430, anode and cathode GDL layers 426, 436, and/or sub-gaskets 452. The hot-pressing may be performed at a temperature and pressure sufficient to bond the layers of the MEA 410, without compromising the characteristics of the membrane 440 and the anode and cathode GDLs 426, 436. For example, the MEA 410 may be hot-pressed at a temperature ranging from about 40° C. to about 160° C., such as from about 60° C. to about 140° C., and at a pressure ranging from about 15 kg/cm$^2$ to about 75 kg/cm$^2$, such as from about 25 kg/cm$^2$ to about 60 kg/cm$^2$. The hot-pressing may be performed for a duration ranging from about 30 seconds to about 15 minutes, such as from about 1 minute to about 10 minutes. In some embodiments, the hot-pressing may be configured to convert the membrane 440 into a sodium form, in order to improve membrane stability.

Pump Separators

Figure 5:
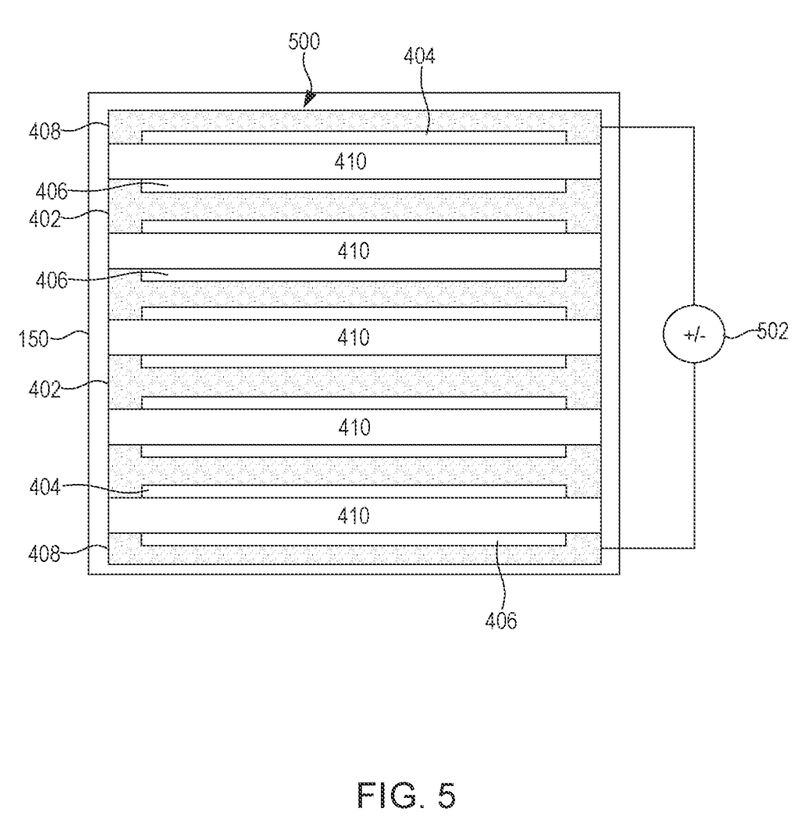
FIG. 5 is a schematic side cross-sectional view of a pump separator including an electrochemical cell stack, according to various embodiments of the present disclosure.

FIG. 5 is a sectional view of a pump separator 150 including an electrochemical cell stack 500, according to various embodiments of the present disclosure. Referring to FIG. 5, the stack 500 may be disposed inside of a housing of the pump separator 150 and may include MEAs 410 separated by flow field plates 402, as shown in FIG. 4. In addition, the stack 500 may include end plates 408 disposed on MEAs 410 disposed on opposing ends of the stack 500. The end plates 408 may be similar to the flow field plates 402, except that the end plates 408 each include only an inlet flow field 404 or an outlet flow field 406.

A voltage or current source 502 may be electrically connected to the stack 500. In particular, the voltage or current source 502 may be electrically connected to the end plates 408, and may be configured to apply a voltage potential or a current across the MEAs 410.

The fuel cell systems and components described herein may have other embodiments and configurations, as desired. Other components may be added if desired. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

We claim:

1. A membrane electrode assembly, comprising:
an ionically-conductive proton exchange membrane;
an anode contacting a first side of the membrane, the anode comprising:
an anode gas diffusion layer,
a first anode catalyst layer containing first catalyst particles, a hydrophobic polymer bonding agent, and a first ionomer bonding agent that lacks functional chains on a molecular backbone; and
a second anode catalyst layer containing second catalyst particles and a second ionomer bonding agent that includes functional chains on a molecular backbone; and
a cathode contacting a second side of the membrane and comprising third catalyst particles and a cathode gas diffusion layer.

2. The membrane electrode assembly of claim 1, wherein:
the first catalyst particles are configured to preferentially catalyze oxidation of carbon monoxide; and
the second catalyst particles are configured to preferentially catalyze generation of hydrogen ions.

3. The membrane electrode assembly of claim 1, wherein the hydrophobic polymer bonding agent comprises polytetrafluoroethylene, and the first ionomer bonding agent comprises a sulfonated tetrafluoroethylene based fluoropolymer-copolymer that lacks the functional chains on the molecular backbone.

* * * * *